Patented Jan. 16, 1940

2,187,081

UNITED STATES PATENT OFFICE 2,187,081

DIMETHYLOL UREA ACETAL CONDENSATION PRODUCT AND PROCESS OF PRODUCING THE SAME

Theodore S. Hodgins, Royal Oak, and Almon G. Hovey, Pleasant Ridge, Mich., assignors to Reichhold Chemicals, Inc., formerly Beck, Koller & Company, Inc., Detroit, Mich.

No Drawing. Application November 10, 1938, Serial No. 239,878

6 Claims. (Cl. 260—70)

The invention relates to the preparation of resinous condensation products suitable for use as coating compositions, said condensation products being formed by reacting an acetal with dimethylol urea, the term "acetal" being construed broadly as including hemi-acetals and formals.

The present application is a continuation-in-part of our prior application Serial No. 203,149 filed April 20, 1938.

According to our process two definite starting materials are employed, namely an acetal and dimethylol urea. By using definite starting materials substantial uniformity of product may be insured, and results obtained with one batch may be reproduced again and again, which is of importance from the commercial standpoint. Furthermore, according to our process it is possible to operate under substantially anhydrous conditions owing to the relatively small quantity of water to be eliminated. Our process also eliminates to a large extent the problem of recovering the solvent from azeotropic mixtures.

The dimethylol urea may be prepared according to known methods, one method being described by Einhorn and Hamberger, Ber., 41, 24 (1908). Other methods of preparation may be employed if desired.

The production of the dimethylol urea may be represented generally by the following equation:

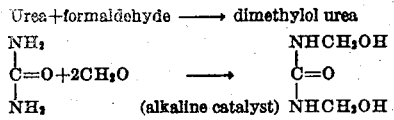

The preparation of the acetal may be represented as follows:

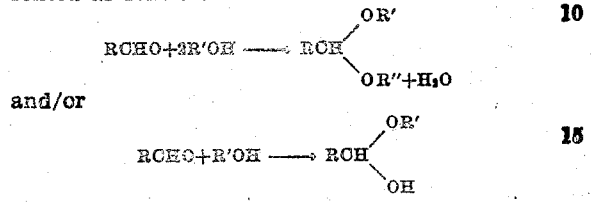

for the hemi-acetal, where R'' represents an aryl or alkyl group and either R or R' represents an aryl or alkyl group or hydrogen while the other represents an aryl or alkyl group.

In order to indicate the scope of our invention and the type of acetals usable in connection with the process, the following tables of acetals are given in order of their empirical formulae and classification as to the length of the aldehyde chain:

TABLE I

ACETALS FROM FORMALDEHYDE

| No. | Empirical formula | Formula | Melting point | Boiling point | Specific gravity |
|---|---|---|---|---|---|
| | | | °C. | °C. | |
| 1 | C₅H₁₂O₂ | CH₂(OC₂H₅)₂ | | 87–88 | 0.851@0°C. |
| 2 | C₇H₁₂O₂ | CH₂(O.CH₂.CH:CH₂)₂ | | 138–9 | 0.9043. |
| 3 | C₉H₁₆O₂ | CH₂(O.CH₂.CH₂.CH:CH₂)₂ | | 175–7 | |
| 4 | C₉H₂₀O₂ | CH₂(O.CH₂.CH₂.CH₂.CH₃)₂ | −61.5 | 180–1 | |
| 5 | C₉H₂₀O₂ | CH₂(O.CH₂.CH(CH₃)₂)₂ | | 164.3 | 0.825@20° C. |
| 6 | C₁₁H₂₄O₂ | CH₂(O.CH₂.CH₂.CH(CH₃)₂)₂ | | 207.3 | 0.835@20° C. |
| 7 | C₁₁H₂₄O₂ | CH₂(O.CH₂.CH(CH₃).CH₂.CH₃)₂ | | 205 | |
| 8 | C₁₇H₃₆O₂ | CH₂(OC₈H₁₇)₂ | | 360 | 0.846@20° C. |
| 9 | C₅H₁₀O₃ | CH₂⟨O.CH₂ / O.CH₂⟩ structure | | 74–75 | 1.0334@35° C. |
| 10 | C₄H₈O₃ | CH₂⟨OCH₂ / OCH₂⟩CHOH | | | |
| 11 | C₄H₈O₃ | CH₂⟨OCH.CH₂OH / OCH₂⟩ | | | |
| 12 | C₆H₁₄O₄ | H₂C—CH.HC—CH₂ with O.CH₂.O groups | 97–8 | 393 | |
| 13 | C₁₄H₁₈O₄ | bis-benzodioxole CH.HC structure | | | |

TABLE II

ACETALS FROM ACETALDEHYDE AND HIGHER ALDEHYDES

| No. | Empirical formula | Formula | Melting point °C. | Boiling point °C. | Specific gravity |
|---|---|---|---|---|---|
| 14 | $C_4H_{10}O_2$ | $CH_3.CH(O.CH_3)_2$ | | 64.4 | 0.8787 @ 0° C. |
| 15 | $C_4H_{10}O_2$ | $CH_3.CH(OH)OC_4H_9$ | | 80–90 | |
| 16 | $C_6H_{14}O_2$ | $CH_3.CH(O.C_2H_5)_2$ | | 102.2 | 0.821 @ 22° C. |
| 17 | $C_8H_{18}O_2$ | $CH_3.CH(O.C_3H_7)_2$ | | 146.8 | 0.825 @ 22° C. |
| 18 | $C_{10}H_{22}O_2$ | $CH_3.CH[O.CH_2.CH(CH_3)_2]_2$ | | 168–170 | 0.816 @ 22° C. |
| 19 | $C_{12}H_{26}O_2$ | $CH_3.CH[O.CH_2.CH(CH_3).CH_2.CH_3]_2$ | | 207–9 | 0.8255 @ 21° C. |
| 20 | $C_{12}H_{26}O_2$ | $CH_3.CH[O.CH_2.CH_2.CH(CH_3)_2]_2$ | | 210.8 | 0.8347 @ 15° C. |
| 21 | $C_4H_8O_2$ | $CH_3.CH \begin{smallmatrix} O.CH_2 \\ \| \\ O.CH_2 \end{smallmatrix}$ | | 82.5 | 1.0002 @ 0° C. |
| 22 | $C_5H_{10}O_3$ | $CH_3.CH \begin{smallmatrix} O.CH_2 \\ \diagdown CHOH \\ O.CH_2 \diagup \end{smallmatrix}$ | | | |
| 23 | $C_5H_{10}O_3$ | $CH_3.CH \begin{smallmatrix} O.CH.CH_2OH \\ \| \\ O.CH_2 \end{smallmatrix}$ | | 85–7 | 1.116 @ 16° C. |
| 24 | $C_8H_{14}O_4$ | $H_3C \text{—} CH.HC \text{—} CH_3$ with $O.CH(CH_3).O$ bridges | 94.5–6 | 201 | |
| 25 | $C_6H_{12}O_2$ | $(CH_3)_2CH.CH \begin{smallmatrix} O.CH_2 \\ \| \\ O.CH_2 \end{smallmatrix}$ | | 122–3 | 0.9641 @ 0° C. |
| 26 | $C_7H_{14}O_3$ | $(CH_3)_2CH.CH_2.CH \begin{smallmatrix} O.CH_2 \\ \diagdown CHOH \\ O.CH_2 \diagup \end{smallmatrix}$ | | | |
| 27 | $C_7H_{14}O_3$ | $(CH_3)_2.CH.CH_2.CH \begin{smallmatrix} O.CH.CH_2OH \\ \| \\ O.CH_2 \end{smallmatrix}$ | | 224–8 | 1.027 @ 0° C. |

The acetals given in the tables may be prepared according to the methods given in Beilstein, vols. 1 and 19, and are adapted to be combined with dimethylol urea according to the processes herein outlined. However, we are not concerned with the particular methods of preparing the acetals.

We have found that a new and useful class of resins can be formed from the dimethylol urea, and an acetal such as is included in the above tables, particularly in the presence of a flux, as illustrated by the monohydric alcohols, the ketones, the aromatic hydrocarbons, the ethers, and the like.

These resinous condensation products are useful as coating compositions, and compatible with the commonly used paint and varnish solvents and with most types of commercial alkyd resins and nitrocellulose, etc.

A resin produced in accordance with our invention has extreme hardness and toughness when baked 1 hour at 250°–300° F. It is very useful as a fortifying resin to be added to alkyd resins both in clear and pigmented films to improve hardness and toughness.

As illustrative of the invention the following examples are given:

Example 1

1 mol of dimethylol urea (120 parts by weight) is added to 1 mol (160 parts) of normal butyl formal in the presence of an excess of commercial xylol (200 parts by weight) and of an acid catalyst, such as ortho phosphoric acid, in sufficient quantity to bring the pH value of the reaction mixture within the range of 5.5–6.5. The progress of the reaction, which is carried on at boiling, of the system is followed by the elimination of water. The end point is determined when approximately 1 mol of water is eliminated. About two hours are required to form a slight viscous solution of a water-white heat-hardening resin which possesses stability on storage. The resulting resin solution can be thinned with alcohols, aromatic hydrocarbons and to a limited extent with straight chain hydrocarbons. The product is useful as an ingredient of various rapid baking hard synthetic enamels particularly in combination with alkyd resins.

Example 2

Parts by weight
1 mol dimethylol urea_____ 120
1 mol n-butyl formal_____ 160
Phosphoric acid_____ 2.8

These materials are refluxed for 2 hours at boiling and vacuum distilled in the presence of butyl alcohol to the desired viscosity. The resulting water-white resin is diluted with butyl alcohol or mixtures of butyl alcohol and xylol or other solvent to the desired solids content.

Example 3

1 mol of dimethylol urea is added to 2 mols of n-butyl formal in the presence of an excess of dioxane, and of sufficient hydrochloric acid to bring the pH value of the mixture within the range 5.5–6.5. The treatment described in Example 1 was followed. The resulting product was softer and more flexible than the product produced by Example 1.

Example 4

1 mol of dimethylol urea is added to 1 mol of n-octyl formal in the presence of an acid catalyst and of an excess of the monoethyl ether of ethylene glycol as a flux. The reaction may be carried out as in Example 1, or Example 2, the product being similar in its characteristics but of greater flexibility owing to the increased carbon length of the formal employed.

Example 5

1 mol of dimethylol urea is added to 2 mols of n-octyl formal in the presence of a suitable flux and of an acid catalyst, and the reaction carried out as outlined in Example 1 or Example 2. The resulting product is softer and more flexible than is obtained where only 1 mol of the formal is employed per mol of dimethylol urea.

Example 6

(a) To 1 mol of dimethylol urea (120 grams), 200 grams of a flux as butanol, and 1 mol n-butyl acetal was added. The acidity of the system was adjusted to a pH 5.5–6.5 with $H_3PO_4$. The system was held at boiling (100°–130° C.) distilling off the water of reaction along with the solvent. The progress of the reaction is noted by the elimination of water during the distillation. After 4–5 hours a slightly viscous water-white resinous product was obtained which was soluble in alcohol, aromatic hydrocarbons and to a limited extent in straight chain hydrocarbons.

Similar resins are prepared from n-butyl acetal and dimethylol urea in accordance with the procedure outlined above, in the presence of other monohydric alcohols or of fluxes such as dioxane, propyl n-amyl ketone, xylene, toluene and the like.

(b) A resin was prepared in accordance with the procedure outlined under (a) above but using 2 mols of n-butyl acetal per mol of dimethylol urea in the presence of a flux. The resulting product possessed greater softness and flexibility indicating that part of the second group had reacted.

Example 7

Resins were prepared according to the processes outlined in Example 6 (a) and (b) but using n-octyl acetal. Here the products were not as hard as in the previous cases, but possessed excellent solubility in straight chain hydrocarbons, such as mineral spirits, and in the usual varnish oils such as linseed oil, tung oil and fish oils. Various fluxes were used without materially affecting the resulting product. Where 2 mols of the acetal were used per mol of dimethylol urea the resulting product had greater flexibility than when only 1 mol of the acetal was employed.

Example 8

(a) To 1 mol of dimethylol urea (120 grams) 200 grams of a flux (dioxane) and 1 mol (159 grams) cyclonol (methyl cyclohexanone glycerol acetal) were added. The mixture was then treated as described in Example 6 (a) and a product generally similar to that obtained under 6 (a) was obtained. Like results were obtained when operating in the presence of monohydric alcohols or other fluxes.

(b) A resin was prepared as in 8 (a) but using 2 mols of cyclonol per mol of dimethylol urea. The product had a greater flexibility than that obtained under 8 (a).

GENERAL NOTES

1. When 1 mol of dimethylol urea per mol of acetal (or formal) is employed the resulting product is harder than when the ratio is 1/2 (1 mol dimethylol urea to 2 mols of acetal).

2. Flexibility, softness and solubility of the product increase with increase in carbon length of the acetal or formal employed. For example the product obtained from n-octyl formal is softer and more flexible than that obtained from n-butyl formal. Moreover the product obtained from n-octyl formal is oil soluble, whereas that obtained from n-butyl formal is not. Also the product obtained from n-butyl acetal is softer and has slightly greater solubility in hydrocarbons than that obtained from n-butyl formal, and similarly the product obtained from n-octyl acetal is softer, and more flexible than that obtained from n-octyl formal.

3. The reaction mixture should be maintained at a pH of 5.5–6.5 by the use of a suitable acid catalyst such as phosphoric acid, hydrochloric acid or sulphuric acid.

4. Various types of fluxes such as the monohydric alcohols, the ketones, the aromatic hydrocarbons and the ethers may be employed in connection with the process, and good results are obtained with all of these types of flux.

5. In general the product obtained by the present process is water-white, heat-hardening and possesses great stability on storage. It is soluble in alcohols, aromatic hydrocarbons, and to a greater or less extent in straight chain hydrocarbons depending on the number of C atoms in the acetal employed in the reaction.

We claim:

1. A process of producing an artificial resin which comprises reacting preformed dimethylol urea and a preformed acetal, the dimethylol urea and acetal constituting the principal reacting ingredients.

2. A process of producing an artificial resin which comprises reacting preformed dimethylol urea and a preformed acetal while maintaining a pH of 5.5–6.5, the dimethylol urea and acetal constituting the principal reacting ingredients.

3. A process of producing an artificial resin which comprises reacting preformed dimethylol urea and a preformed acetal while maintaining a pH of 5.5–6.5 in the presence of a flux, the dimethylol urea and acetal constituting the principal reacting ingredients.

4. A clear water-white, heat-convertible resin formed by reacting preformed dimethylol urea and a preformed acetal, the acetal and dimethylol urea constituting the principal reacting ingredients, said resin being particularly adapted for use as an ingredient in coating compositions, and being compatible with the commonly used paint and varnish solvents and with commercial alkyd resins and nitrocellulose, and having extreme hardness and toughness when baked for 1 hour at 250°–300° F.

5. A coating composition comprising the resin defined in claim 4 and a non-aqueous solvent.

6. A coating composition comprising the resin defined in claim 4 and a common varnish solvent.

THEODORE S. HODGINS.
ALMON G. HOVEY.